C. KINSLEY.
SYSTEM OF TELEGRAPHIC COMMUNICATION.
APPLICATION FILED NOV. 26, 1907.
1,126,642.
Patented Jan. 26, 1915.
4 SHEETS—SHEET 1.
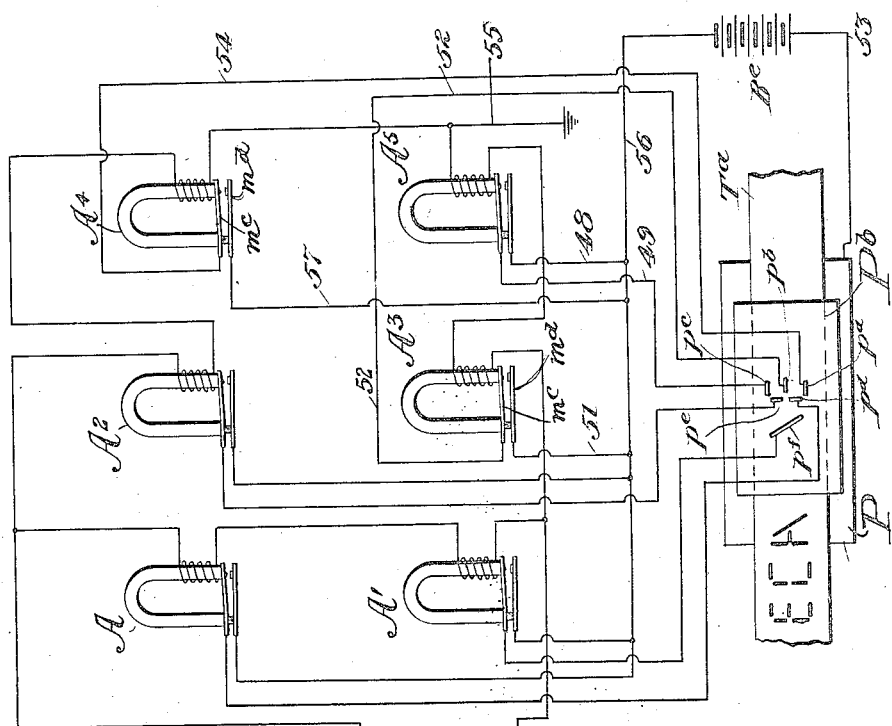
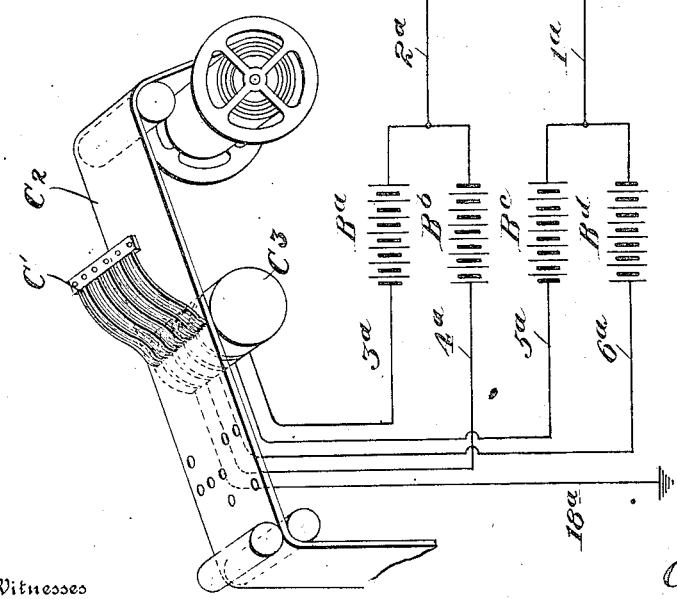
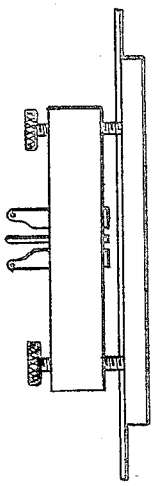
Witnesses
H. F. Löwenstein
James H. Marr
Inventor
Carl Kinsley
By Edward E. Clement
Attorney

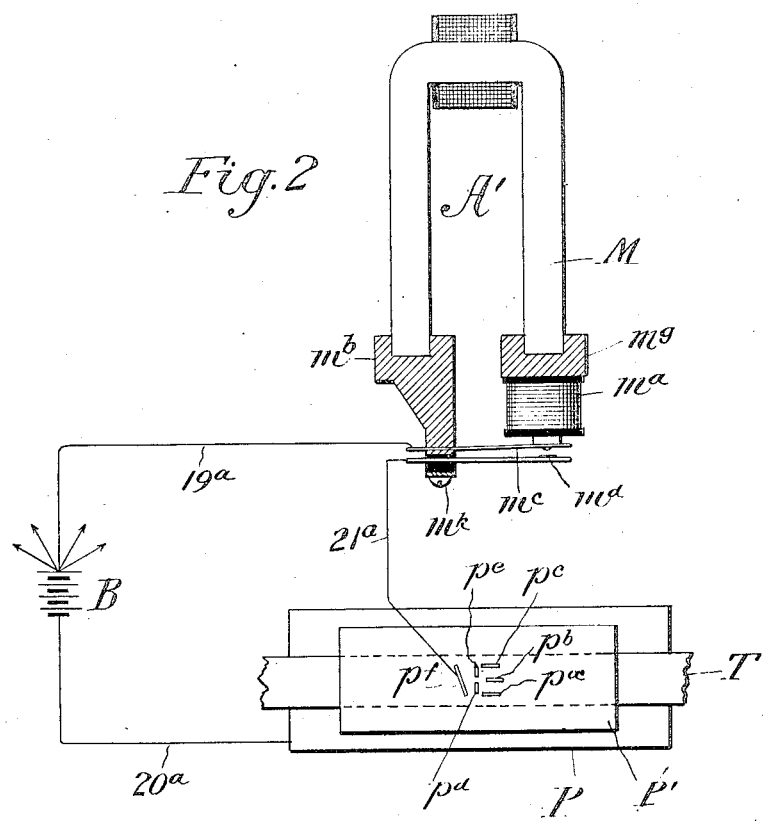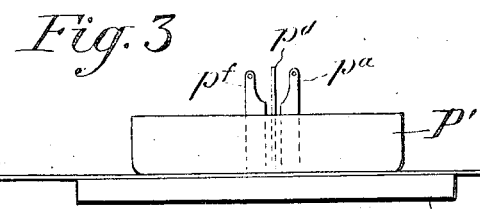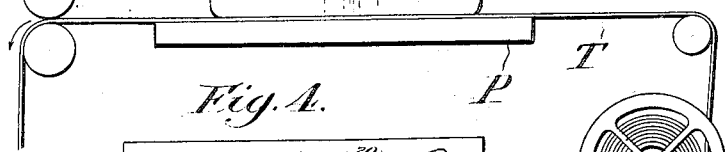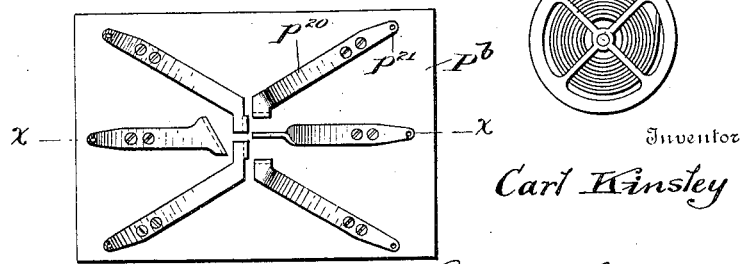

C. KINSLEY.
SYSTEM OF TELEGRAPHIC COMMUNICATION.
APPLICATION FILED NOV. 26, 1907.
1,126,642.
Patented Jan. 26, 1915.
4 SHEETS—SHEET 3.
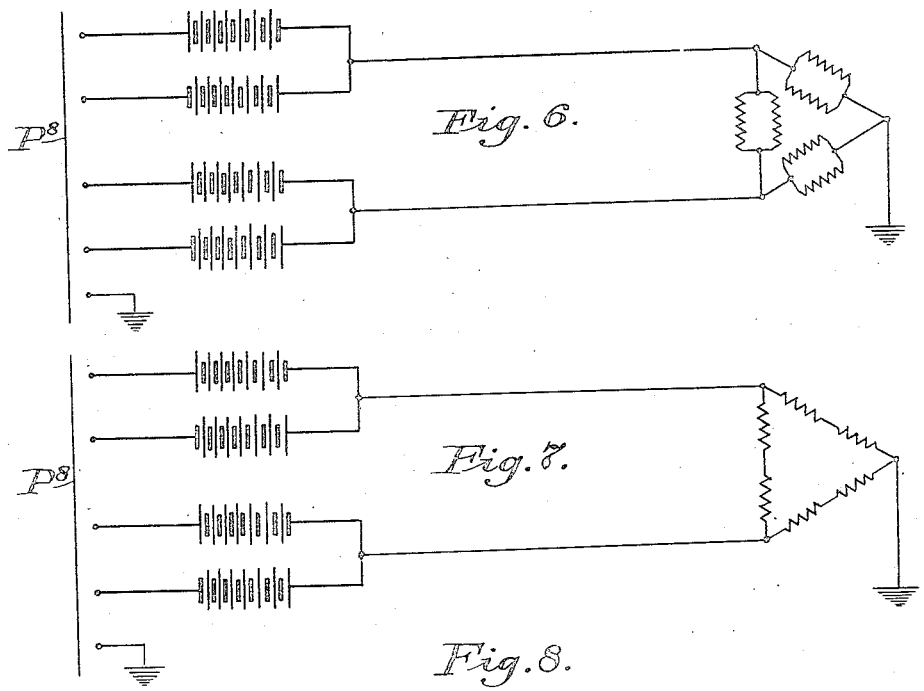

C. KINSLEY.
SYSTEM OF TELEGRAPHIC COMMUNICATION.
APPLICATION FILED NOV. 26, 1907.
1,126,642.
Patented Jan. 26, 1915.
4 SHEETS—SHEET 4.
Fig. 10.
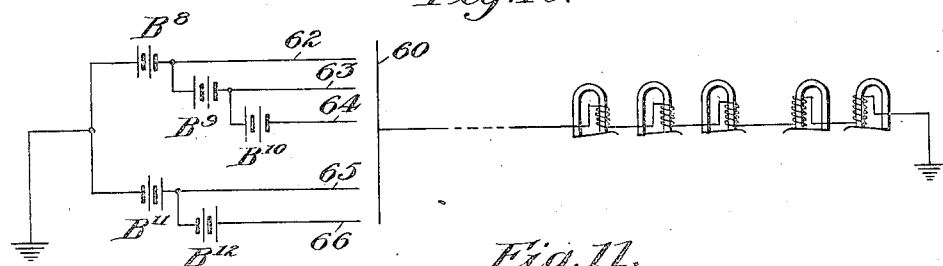
Fig. 11.
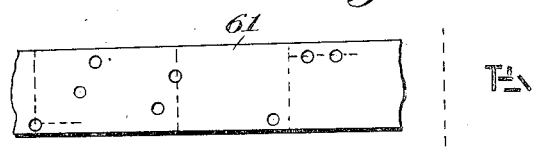
Fig. 12.
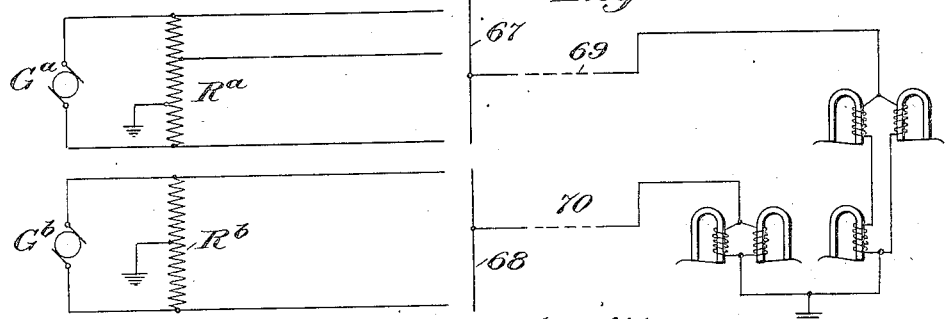
Fig. 13.
ABCDEFGHIJKLMNOPQRSTUVWXYZ
1234567890
Fig. 14.
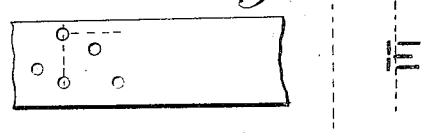
Witnesses
H. Löwenstein
James H. Marr
Inventor
Carl Kinsley
By Edward E. Clement.
Attorney

UNITED STATES PATENT OFFICE.

CARL KINSLEY, OF CHICAGO, ILLINOIS.

SYSTEM OF TELEGRAPHIC COMMUNICATION.

1,126,642. Specification of Letters Patent. Patented Jan. 26, 1915.

Application filed November 26, 1907. Serial No. 403,885.

*To all whom it may concern:*

Be it known that I, CARL KINSLEY, a citizen of the United States, residing at Chicago, in the county of Cook and State of Illinois, have invented certain new and useful Improvements in Systems of Telegraphic Communication, of which the following is a specification, reference being had therein to the accompanying drawing.

My invention relates to systems of telegraphic communication, and to the apparatus and methods of operation employed therein.

It has for its purpose the improvement of such systems, apparatus and methods.

The invention combines some of the principles of the mechanical printing telegraph with those of the chemical recorder, but in such a manner as to eliminate certain faults of both, while retaining their advantages.

An object of the invention is to avoid the use of movable printing electrodes, which unless very carefully made and adjusted tend to slow down the working of a line with which they are employed.

Other objects will appear from the detailed description hereinafter, and from the claims appended thereto.

Briefly stated, the invention comprises a fixed platen, a sensitized paper tape passing thereover, an insulating support held over the tape and having mounted upon or embedded within it the character printing electrodes, which are either fixed or movable with reference to the surface of the tape, and may be either in contact therewith or at a definite sparking distance therefrom. A local circuit is provided for each element, controlled by a sensitive relay especially designed to respond to line impulses at high frequency.

The platen constitutes one terminal of all the local circuits, which are connected thereto through a common battery and a common return wire. The printing electrodes are six, five or less in number, are straight in their contour lines, and are arranged so that by combining two or more of them in printing effect upon the paper, any desired letter of the alphabet or numeral from naught to nine can be produced. Thus by actuating two or more of the relays in a predetermined order and manner the corresponding printing electrodes can be caused to leave their juxtaposed impressions upon the tape, and letters can thus be printed by means of the line impulses.

The relays I employ are peculiar in their design, and are highly sensitive. Each comprises a horse-shoe or bipolar magnet which may be of permanent nature, or maintained in magnetic condition by means of a suitable energizing coil. A combined armature and spring contact is mounted upon one pole piece with its end extending into operative contiguity with the other. This end is normally held up to the working pole piece so as to be under tension. A line impulse of the proper direction to partially or wholly neutralize the magnetic attraction between the pole piece and spring, results in the release of the latter, which in snapping away from the pole closes the local circuit associated with it, and thereby causes a momentary passage of current to take place through the corresponding character printing electrode. The recording surface employed herein in conjunction with this relay and the fixed electrodes is a continuously moving and very nearly dry paper tape. (The printing may be done upon this tape either by the electrolytic effect of passing current, or by sparking.) In the latter case I provide suitable supporting means and adjustments whereby the printing electrodes may be set in predetermined position with respect to the surface of the tape.

Referring to the accompanying drawings, wherein the same reference letters indicate the same parts throughout, Figure 1 is a diagram of a complete system embodying my invention. Fig. 2 illustrates diagrammatically one of the local circuits with a printing platen and printing members and with the polar relay enlarged. Fig. 3 is a side elevation of the printing platen, its associated printing members and the printing tape, as shown in plan in Fig. 2. Fig. 4 is a plan view of the preferred form and mounting for the printing electrodes. Fig. 5 is a longitudinal section taken on line $x$—$x$ of Fig. 4. Fig. 6 is a theoretical diagram showing the relays arranged in parallel. Fig. 7 is a similar diagram showing the relays in series or as used in Fig. 1, and showing in a simplified way the triangular connection of the coils. Fig. 8 shows an alphabet used with the circuits and apparatus of Figs. 1 to 7. Fig. 9 is an alphabet composed of five elements. Fig. 10 is a diagrammatic view of a complete system used to form the alphabet shown in Fig. 9. Fig. 11 is a fragmentary piece of the transmitting tape and detached therefrom is an illustration of the arrangement of the printing elements. Fig. 12 is a diagrammatic view of a system using generators instead of batteries. Fig. 13 is an illustration of a five-element alphabet produced by the receiver of Fig. 12, and Fig. 14 is a fragmentary view of the printing tape showing detached therefrom the arrangement of the printing elements for said alphabet. Fig. 15 is a view similar to Fig. 3 showing a modified arrangement of the platen for printing by spark.

Referring to Fig. 1, line wires $1^a$ and $2^a$ are employed, leading from the transmitting station to the receiving station. In operation, I automatically record the messages in legible characters at the receiving station through the agency of a number of polarized printing relays, worked by positive and negative impulses sent over the line wires $1^a$ and $2^a$ separately or simultaneously. The mechanical arrangement for controlling the transmission of impulses is merely indicated in Fig. 1. A paper tape $C^2$ passes over a platen $C^3$ and under a set of springs or contact brushes $C'$ (shown in Fig. 1). The brushes $C'$ are permitted to make contact at predetermined times and in predetermined order with the platen $C^3$ through perforations punched in the tape in any suitable manner. As the method of preparing tape in this way is well understood in the art it is unnecessary for me to describe it. All messages are punched in the tape as a preliminary to the transmitting operation.

The circuit connections of the transmitter are as follows: $B^a$, $B^b$, $B^c$, $B^d$ are the main transmitting batteries, arranged in pairs with poles reversed to line, and connected to the line conductors $1^a$ and $2^a$ as shown. The wires $3^a$, $4^a$, $5^a$, $6^a$, connect the other poles of the batteries to four of the five collector rings over which the tape $C^2$ passes. The fifth collector ring is connected to the ground by the wire $18^a$.

The relays at the receiving station control local circuits which include the printing electrodes $p^a$, $p^b$, $p^c$, $p^d$, $p^e$, $p^f$, and the printing platen P. The mechanical features of these relays and the circuits and parts controlled thereby will be pointed out presently. Their connections are shown in Fig. 1. The windings of relays A and $A'$ are included in series in a bridge across the line wires $1^a$ and $2^a$, this bridge constituting one side of a triangle at the receiving station. The windings of the relays $A^3$ and $A^5$ are connected in series in a ground branch from wire $1^a$, forming another side of the triangle; while the windings of relays $A^2$ and $A^4$ are similarly connected in series in a ground branch from the line wire $2^a$ forming the third side of the triangle. The ground connection is marked 55. It will thus be seen that each side of the triangle contains one pair in series, the relays of each pair being oppositely polarized from each other.

Each relay is provided with a movable contact $m^c$ and a stationary or anvil contact $m^d$. Each of the relays has its contacts $m^c$ and $m^d$ connected in a local circuit and normally held open by its magnet. All the local circuits have a common return which includes a source of current $B^e$, and a common printing platen P, over which the individual printing contacts rest upon the tape T. This tape is chemically sensitized with any one of the several solutions commonly employed for that purpose, such as potassium ferrocyanid, which may be mixed with ammonium nitrate to preserve the moisture of the tape. I preferably make the tape rather dry and boost the potential of the current in the local circuits. When the above mentioned solution is used the actual printing tips should be of iron. However, I may use aluminum, platinum, or other suitable material, and change my sensitizing solution accordingly.

The local circuit of the electrode $p^b$, which is closed by the relay $A^3$, is as follows: from the battery $B^e$, through wire 56, wire 51, anvil contact $m^d$, movable contact $m^c$, wire 52, electrode $p^b$, through the printing tape to the printing platen P and back to battery by wire 53. The local circuit of the electrode $p^a$, which is controlled by the relay $A^4$, is as follows: battery $B^e$, wire 56, wire 57, anvil contact $m^d$, movable contact $m^c$, wire 54, electrode $p^a$, through the printing tape T to the printing platen P, and back to battery by wire 53. The electrode $p^c$ has its circuit traced as follows: $B^e$, 56, 48, contacts of relay $A^5$, wire 49, $p^c$, through the printing tape T, printing platen P, and back to the battery by wire 53. The circuits of electrodes $p^d$, $p^e$, $p^f$ are similar to those given and need not be traced.

In Fig. 2 I have shown a simplified diagram of one local circuit with an enlarged or exaggerated relay. This relay comprises an electro or permanent magnet M having pole pieces $m^b$ and $m^g$, the latter reduced in diameter for a portion of its length to form a core for the coil $m^a$. The contact spring $m^c$ and the anvil strip $m^d$ are fixed upon the pole piece $m^b$, with their free ends extending into operative contiguity with the pole $m^g$, and the spring $m^d$ insulated from the pole $m^b$ and spring $m^c$. Normally the end of the spring $m^c$ is held up to the pole so as to maintain the spring in a distorted shape, and under tension. This spring is of such proportion as to have a high natural period, but is attenuated as to mass, so as to respond to line impulses of various frequencies. A conductor 19a is connected from the spring $m^c$ to the battery. From the opposite side of the battery the common return conductor 20a leads to the printing platen P. The circuit is completed to the electrode $p^t$ by wire 21a connected to the anvil contact $m^d$. All of the contacts are mounted in a stationary insulating block $P^b$ held in any suitable manner upon or over the printing tape T so that all of the printing electrodes $p^a$, $p^b$, etc., are fixed.

In Fig. 3 I show the block resting directly on the tape, but when printing by spark it is of course raised by means of posts or screws, preferably supported on the platen P, as shown in Fig. 15. The coil $m^a$ is connected to line and when a current of suitable direction passes through it the magnet M is weakened or neutralized to release the contact spring $m^c$ which then snaps down into engagement with the anvil contact $m^d$, and the circuit including the conductors 19a, battery $B^e$, conductor 20a, printing platen $P^a$, and electrode $p^t$ is thus closed through the tape. The potential difference due to battery $B^e$ is sufficient to cause current to pass through the tape to the platen $P^a$, and thus effect a chemical decomposition in the tape to print. The impulses which affect the magnet M are of course only momentary and while they are sufficient to weaken the magnetism in the relay magnet and allow the movable contact $m^c$ to snap into engagement with the anvil contact $m^d$, they are not sufficiently long to prevent the immediate reattraction of the movable contact. The six electrodes and six relays are sufficient to print the entire alphabet, so that by sending properly coordinated impulses of selected polarity any letter or numeral may be produced on the tape. For instance, if relay $A^3$ is energized followed immediately by relays $A^5$ and $A^4$ and then by relays $A^2$ and A, the letter "E" would be produced; or if relay $A^3$ is energized followed shortly by relays $A^2$ and A and then after the proper interval by relay $A'$, the letter "A" would be produced.

In Figs. 4 and 5 I have illustrated a preferred method of mounting the several electrodes. As represented here, the contacts are formed as integral parts of springs secured to the top of the mounting block $P^b$, and have their printing tips or surfaces extending below the bottom of the mounting block so that when the structure is pressed into engagement with the tape the electrodes are moved upward against the tension of the springs. In this way, any wearing away of the metal of the electrodes due either to friction or corrosion or variations in thickness of the paper, will be compensated for and a permanent and positive contact between them and the paper will be assured at all times. I have numbered these springs $p^{20}$ so as to properly distinguish them and have shown each one provided with a contact tip $p^{21}$ for solder connection with its respective local circuit wire.

In Figs. 6 and 7 I have illustrated the theoretical arrangement of the circuits, the latter figure being a schematic diagram of the series arrangement shown in Fig. 1, and the former being a similar arrangement, with the windings of the relays arranged in parallel. The wire $P^8$ in both figures has brush terminals for effecting circuit connections to transmit the proper impulses.

In Fig. 8 I show an alphabet composed of six elements which is especially adapted for use with the arrangements of circuits and apparatus shown in Figs. 1 to 7.

In Figs. 1 to 8 inclusive, I have illustrated a six-element system, but I desire it to be understood that I also use five or less elements and still produce a perfectly legible alphabet, as illustrated in Fig. 9. This figure shows the product of the receiver of Fig. 10 in which I have shown a one-wire system having three current strengths, with the receiving relays arranged in series in the line and with the operating pens or contacts of three of the relays reversed with respect to the other two. I have indicated the platen as a single line numbered 60. Brushes are secured to the battery leads 62, 63, 64, 65 and 66 and are adapted to rest upon the paper so as to drop or be forced through the openings in the tape as they register with the particular brushes. It will be seen that if the brush connected to lead 62 is thus touched to the platen 60 through an aperture in the tape an impulse from battery $B^8$ will pass over the line and the relay set to respond to current from $B^8$ will have its permanent pole neutralized so as to release its pen and allow it to snap down into contact with the anvil $m^d$, thereby closing the local circuit to the associated electrode resting on the chemically sensitized printing tape (not shown herein). If the brush connected to lead 63 be touched to the platen through an aperture in the tape, batteries $B^8$ and $B^9$ will be connected in series and thus current of a different strength will be transmitted. Similar results follow if the other brushes be touched to the platen, but the batteries $B^{11}$ and $B^{12}$ have their poles reversed to line, to work the reversed relays.

In Fig. 12 a system is shown employing five relays at the receiving station, permitting the use of five instead of six elements for printing. In this figure I have shown two platens 67 and 68 connected to the line wires 69 and 70 which lead to the different relays. The generators $G^a$ and $G^b$ have their terminals bridged by the resistances $R^a$ and $R^b$ the former being divided into three parts and the latter into two parts. In this manner I am enabled to determine to a nicety the current strength supplied to the relays and the direction thereof. The relays connected to line 70 are two in number and are arranged in multiple, and the relays connected with line 69 are three in number arranged in series multiple. The alphabet shown in Fig. 13 is made up of five straight-line elements formed by the successive action of the relay contacts or armatures as they are snapped into engagement with their anvils to close the printing circuit to the chemically sensitized recording tape at the receiving end of the line.

Many non-essential changes in the circuits and apparatus thus described may be resorted to in practice, and I desire it understood that all such changes and modifications are contemplated by me and are considered within the purview of the appended claims. For example, I believe that six, five or less straight-line printing elements in the forms shown herein, or in any other form have never been used to produce all the letters of the alphabet and all of the numerals. I intend to claim the same broadly.

By connecting the receiving relays to line and having their contacts momentarily control local circuits in which the printing electrodes are included, I avoid all tailings due to line discharges, which tend to smear the tape and render it illegible. Furthermore, in the local circuits I can use a relatively high potential without any trouble.

Having thus described my invention, what I claim and desire to secure by Letters Patent is:

1. In a telegraphic system, a line, a source of current therefor, receiving apparatus comprising a chemical printer having printing type shaped in the forms of the characters to be printed, included in a local circuit, normally active means for disabling said local circuit, transmitting means for determining the flow of current in the line, and means responsive to said current for neutralizing the disabling means.

2. In a high speed telegraphic receiving apparatus, a continuously moving recording surface, character-shaped printing type held stationary with respect thereto, a local circuit including a source of current, a relay having one of its contacts tending to move away, but normally held within its field, and means to modify said field to control the local circuit.

3. In high speed telegraphic receiving apparatus, a continuously moving record surface, a recording character shaped printing element held stationary, and a polarized relay having a fixed and a movable contact, the movable contact being self-actuating and normally held within the magnetic field, and means responsive to a predetermined character of line current to partly or wholly neutralize the field so as to release the movable contact and thereby close the circuit of the printing element.

4. In high speed telegraphic receiving apparatus, a continuously moving record surface, a recording character shaped printing element held stationary, and a polarized relay having a fixed and a movable contact, the movable contact being self-actuating and normally held within the magnetic field, and means responsive to a predetermined character of line current to partly or wholly neutralize the field so as to release the movable contact and thereby close the circuit of the printing element, the length of the effective part of each line impulse, and the duration of the neutralizing magnetic force in the relay, being so determined that they will not exceed in duration the time required for one complete cycle of operation of the movable relay contact, to close and open the local circuit of the printing element.

5. In a high speed telegraphic system, means for transmitting impulses, and means for receiving and translating the impulses comprising the following instrumentalities: a chemical printing surface and a type faced electrode in constant printing relation thereto and adapted to print by the passage of current whereby its time constant is reduced practically to zero, a local circuit and a source of current for said electrode, and a relay comprising fixed and movable elements, the movable element being rendered self-actuating by stored up energy but normally disabled by the fixed element, and means responsive to the line impulses to neutralize the disabling effect of the fixed element, the parts being so constructed and related that the time required for one complete cycle of operation of the movable element of the relay is approximately the reciprocal of the frequency of the line impulses, and the effective part of each line impulse does not exceed the time constant of said movable element.

6. In a high speed telegraphic system, means for transmitting impulses, and means for receiving and translating the impulses comprising the following instrumentalities: a recording surface and a type faced electrode in printing relation thereto, a circuit and a source of current for said electrode, and a relay controlling said circuit comprising a magnetic fixed element, a fixed contact, and a movable contact normally held under tension by said magnetic element but adapted when released to automatically move into and out of engagement with the fixed contact, and means responsive to the line impulses for neutralizing the holding effect of the magnetic element, thereby releasing the movable contact.

7. In a telegraphic system, a receiver comprising a chemical recording surface, a plurality of fixed printing elements having their faces shaped in the form of characters to be printed and whose total number does not exceed six, normally open local circuits including said printing elements, and a relay for each of said circuits, each of said relays having a fixed and a movable contact, said movable contact being self-actuating, means normally disabling each movable contact, and means responsive to a line current impulse to neutralize the effect of each disabling element for a period shorter than that required for a complete cycle of operation of its movable contact in closing and opening the local circuit of its electrode, whereby a letter or numeral may be printed by combined action of the printing elements, in response to one or more line impulses received.

8. In a telegraphic system, a receiver comprising a chemical recording surface, a plurality of fixed printing elements having their faces shaped in the form of characters to be printed and whose total number does not exceed six, normally open local circuits including said printing elements, and a relay for each of said circuits, each of said relays having a time constant represented approximately by the reciprocal of the line impulse frequency, and adapted to work upon line impulses up to that frequency and of a duration not exceeding the relay time constant.

9. A high speed telegraphic system having means for transmitting impulses of predetermined character and very short duration at high frequency over a telegraphic line, and a receiver comprising a recording surface and fixed character printing electrodes having a zero time constant, local circuits for said electrodes and selective relays for said local circuits each having a time constant represented approximately by the reciprocal of the line impulse frequency, each relay operating by means of stored up locally imparted energy normally detained but released for actuation, with release means for each relay responsive to a line impulse during a period of shorter duration than the time constant of the relay.

In testimony whereof I affix my signature in presence of two witnesses.

CARL KINSLEY.

Witnesses:
STELLA BRANDENBURG,
JAMES E. BISTOR.